(12) United States Patent
Takeda

(10) Patent No.: US 8,212,528 B2
(45) Date of Patent: Jul. 3, 2012

(54) RECHARGEABLE BATTERY PROTECTION INTEGRATED CIRCUIT DEVICE WITH A SHORT CIRCUIT DETECTING VOLTAGE CHANGE PART, RECHARGEABLE BATTERY PROTECTION MODULE USING THE RECHARGEABLE BATTERY PROTECTION INTEGRATED CIRCUIT DEVICE WITH A SHORT CIRCUIT DETECTING VOLTAGE CHANGE PART, AND BATTERY PACK WITH A SHORT CIRCUIT DETECTING VOLTAGE CHANGE PART

(75) Inventor: Takashi Takeda, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 401 days.

(21) Appl. No.: 12/575,581

(22) Filed: Oct. 8, 2009

(65) Prior Publication Data

US 2010/0141215 A1    Jun. 10, 2010

(30) Foreign Application Priority Data

Dec. 4, 2008    (JP) .................................. 2008-310105

(51) Int. Cl.
    *H01M 10/46*    (2006.01)
(52) U.S. Cl. ........................................ 320/134; 320/136
(58) Field of Classification Search .................. 320/107, 320/134, 136
    See application file for complete search history.

(56) References Cited

U.S. PATENT DOCUMENTS

| 2003/0141847 | A1 | 7/2003 | Fujiwara |
| 2006/0208850 | A1* | 9/2006 | Ikeuchi et al. ................. 320/136 |
| 2009/0251104 | A1* | 10/2009 | Yamamoto et al. ........... 320/134 |

FOREIGN PATENT DOCUMENTS

| JP | 2003/037944 | 2/2003 |
| JP | 2007-049796 | 2/2007 |
| WO | WO2007/138901 | 12/2007 |

OTHER PUBLICATIONS

Extended European Search Report dated Feb. 18, 2010.

* cited by examiner

*Primary Examiner* — Edward Tso
(74) *Attorney, Agent, or Firm* — IPUSA, PLLC

(57) ABSTRACT

A rechargeable battery protection integrated circuit device, includes a short circuit detecting circuit configured to convert a discharge electric current of a rechargeable battery to a voltage value and detect a short circuit state of the rechargeable battery when the converted voltage value is equal to or greater than a designated short circuit detecting voltage; a discharge control terminal configured to output a control signal when the short circuit state is detected by the short circuit detecting circuit, the control signal being configured to stop a discharge of the rechargeable battery; and an overcharge detecting circuit configured to detect an overcharge of the rechargeable battery, wherein the short circuit detecting circuit includes a short circuit detecting voltage change part, the short circuit detecting voltage change part being configured to change the short circuit detecting voltage when the overcharge is detected by the overcharge detecting circuit.

6 Claims, 9 Drawing Sheets

RECHARGEABLE BATTERY PROTECTION INTEGRATED CIRCUIT DEVICE WITH A SHORT CIRCUIT DETECTING VOLTAGE CHANGE PART, RECHARGEABLE BATTERY PROTECTION MODULE USING THE RECHARGEABLE BATTERY PROTECTION INTEGRATED CIRCUIT DEVICE WITH A SHORT CIRCUIT DETECTING VOLTAGE CHANGE PART, AND BATTERY PACK WITH A SHORT CIRCUIT DETECTING VOLTAGE CHANGE PART

CROSS-REFERENCE TO RELATED APPLICATIONS

This patent application is based upon and claims the benefit of priority of Japanese Patent Application No. 2008-310105 filed on Dec. 4, 2008 the entire contents of which are incorporated herein by reference.

BACKGROUND OF THE INVENTION

1. Field of the Invention

The present invention generally relates to rechargeable battery protection integrated circuit devices, rechargeable battery protection modules using the rechargeable battery protection integrated circuit devices, and battery packs. More specifically, the present invention relates to a rechargeable battery protection integrated circuit device including a short circuit detecting circuit, the short circuit detecting circuit being configured to convert a discharge current of a rechargeable battery to a voltage value and detect a short circuit state of the rechargeable battery when the voltage value is equal to or greater than a short circuit detecting voltage, a rechargeable battery protection module using the rechargeable battery protection integrated circuit device, and a battery pack.

2. Description of the Related Art

Conventionally, a rechargeable battery protection module configured to protect a rechargeable battery such as a lithium battery has been suggested. FIG. 1 is a circuit diagram of a related art rechargeable battery protection module 250 including a rechargeable battery protection integrated circuit 120. As shown in FIG. 1, the related art rechargeable battery protection module 250 is connected in parallel with a rechargeable battery and a charger is connected to terminals P+ and P− so that a battery pack 300 is formed. In the rechargeable battery protection module 250, as charge and discharge control FETs (Field Effect Transistor), N channel MOS (Metal Oxide Semiconductor) transistors M1 and M2 having 10 mΩ of on-resistance values are used. A charge and discharge electric current is converted to a voltage by the on-resistance values of the charge control MOS transistor M1 and the discharge control MOS transistor M2, so as to be detected by a V-terminal. On and off control of the charge control MOS transistor M1 is performed by a COUT terminal. The charge control MOS transistor M1 is turned off in an overcharge state or an abnormal charger connecting state (charge over-current state) so that the rechargeable battery is protected. In addition, on and off control of the discharge control MOS transistor M2 is performed by a DOUT terminal. The discharge control MOS transistor M2 is turned off in an over-discharge state, a discharge over-current state, or an output short-circuit state so that the rechargeable battery is protected.

The over-charge state and over-discharge state are detected by an overcharge detecting circuit 10 and an over-discharge detecting circuit 20 by monitoring a voltage of a VDD terminal. On the other hand, the charge over-current state, the discharge over-current state, and the output short-circuit state are detected by a charge over-current detecting circuit 40, a discharge over-current detecting circuit 30, and a short-circuit detecting circuit 50, respectively, by monitoring a voltage of the V-terminal.

The discharge of the rechargeable battery protection module 250 can be made via a body diode D1 of the charge control MOS transistor M1 even if the charge control MOS transistor M1 is turned off. The charging of the rechargeable battery protection module 250 can be made via a body diode D2 of the discharge control MOS transistor M2 even if the discharge control MOS transistor M2 is turned off. Accordingly, if the battery is in the overcharge state, when a load is connected, the battery is discharged so as to recover from the overcharge state. In addition, if the battery is in the over-discharge state, when a charger is connected, the rechargeable battery is charged so as to recover from the over-discharge state.

FIG. 2 is a view showing an example of a cross-sectional structure of a normal N channel MOS transistor, the transistor being applied to the charge control MOS transistor M1 and the discharge control MOS transistor M2. Referring to FIG. 2, a channel between a drain D and a source S is not opened if a positive voltage is not applied to a gate G. However, a forward current flows by a parasitic diode D1 of a PN junction via a P-type substrate, between the drain D and a back gate BG where the source S is connected. In other words, the electric current flows from the back gate BG (source S) to the drain D even if the N channel MOS transistor per se is turned off. In this case, a voltage generated in the PN junction when the forward current flows in the PN junction is 0.6 V through 0.7 V.

Referring back to FIG. 1, as discussed above with reference to FIG. 2, even if the charge control MOS transistor M1 is turned off, when the load is connected to the rechargeable battery, the discharge electric current flows in the forward direction of the body diode D1 and a positive voltage Vf (≈0.6 V) is applied to the charge control MOS transistor M1. Similarly, even if the discharge control MOS transistor M2 is turned off, when the charger is connected to the P+ terminal and the P− terminal, the charging electric current flows in the forward direction of the body diode D2 and a negative voltage is applied to the discharge control MOS transistor M2. Because of this, the battery pack 300 can discharge in the overcharge state if the load is connected and can be charged in the over-discharge state if the charger is connected.

For example, Japanese Laid-Open Patent Application Publication No. 2007-49796 has suggested a semiconductor device for protecting a rechargeable battery at least from excessive discharge current due to over-discharge of the rechargeable battery, the semiconductor device including a first excessive discharge current detection circuit configured to detect first excess of a voltage at an externally or an internally provided electric current detection terminal exceeding a first voltage level, the electric current detection terminal converting a discharge current to a positive voltage with respect to ground potential; a second excessive discharge current detection circuit configured to detect a second excess of the absolute voltage at the electric current detection terminal exceeding a second voltage level higher than the first voltage level; a delay circuit configured to cause each of the first and second excessive discharge current detection circuits to delay its output by a predetermined delay time; and a delay reducing circuit configured to produce a delay time reducing signal for reducing the delay time at a predetermined ratio when a negative voltage lower than a predetermined negative voltage level or a positive voltage higher than a third voltage level is applied to the electric current detection terminal. With this arrangement, each signal output from the first and second excessive discharge current detection circuits is delayed by a certain delay time produced by the delay circuit. This delay time can be adjusted or reduced at a predetermined ratio based on the delay time reducing signal, which signal is generated when a prescribed condition is satisfied. This arrangement can deal with different levels of excessive discharge currents without increasing the area size of the IC chip.

In the meantime, the structure of the related art device shown in FIG. 1 has the following problems. In a case where the load is connected during the overcharge detecting of the rechargeable battery protection module 250 so that the rechargeable battery is discharged, when a voltage of the V-terminal is increased by Vf by the body diode D1 of the charge control MOS transistor M1 so that an increase of electric potential of the V-terminal by the body diode D1 becomes equal to or greater than a short-circuit detecting voltage, a short-circuit protection function works. In other words, in this case, if the discharge control MOS transistor M2 is turned off when the charge control MOS transistor M1 is turned off due to detection of an overcharge, both charge and discharge cannot be performed.

For example, when the short circuit detection voltage of the V-terminal is 0.5 V and on-resistance of the charge control MOS transistor M1 is 50 mΩ, the short circuit protection works in the case of a short circuit electric current being equal to or greater than 10 A. In this case, while setting of the short circuit electric current is proper, if the short circuit detecting voltage is 0.5 V, the voltage of the V-terminal is increased to approximately 0.6 V at the forward direction voltage Vf of the body diode D1 and thereby the short circuit protection function acts. As a result of this, regardless of the overcharge state, the discharge control MOS transistor M2 is turned off, so that both charge and discharge cannot be performed.

Because of this, as a measure to avoid such a condition, for example, the short circuit detection may not be performed in the overcharge state. However, with this measure, discharging can be performed in the overcharge state. Therefore, while it is possible to handle the battery pack 300, the rechargeable battery cannot be protected when the short circuit of the rechargeable pack 300 occurs during the overcharge state. Hence, there may be a serious problem with the protection function of the rechargeable battery.

As an alternative measure, the short circuit detection voltage may be greater than the amount of increase of the V-terminal by the forward direction voltage Vf of the body diode D1 of the charge control MOS transistor M1. In this case, while discharging in the overcharge state can be performed and protection against the load short circuit during the overcharge state can be provided, the short circuit detection threshold value at the normal time may be greater. In other words, if the short circuit detection threshold value is too high, the range where the short circuit protection works at the normal time may become narrow. For example, when the short circuit detection threshold value is 1.0 V higher than 0.6 V, in a case where the on-resistance of the charge control MOS transistor M1 is 50 mΩ, the short circuit protection is performed at the short circuit electric current equal to or greater than 20 A. However, this electric current is too large and it is necessary to perform the short circuit protection when smaller short circuit electric currents flow.

FIG. 3 is a circuit diagram showing a short circuit state of the related art battery pack 300. More specifically, in the example shown in FIG. 3, the short circuit of the battery pack 300 is made by the load of the impedance RL 130. As shown in FIG. 3, the short circuit of the battery pack 300 is made with the impedance RL of several 100 mΩ by a contact resistance, a broken line resistance, the fuse 140 for protecting the physical over-current, or the like. The short circuit electric current at this time is limited by an inside impedance of the rechargeable battery and the impedance RL 130. Accordingly, in a case where the electric current limitation by which the short circuit protection is operated is too large, the protection may not be provided when the protection is required.

In a small size and low consumption electric current device using a rechargeable battery having a large internal impedance and small output electric current capability, safe properties are increased by setting the short circuit detection voltage low. Accordingly, if the short circuit detection voltage of the rechargeable battery protection module 250 is set to be greater than the voltage increase Vf by the body diode D1 of the charge control MOS transistor M1, it may be difficult to meet the demands of the small size and low consumption electric current device.

In addition, in the above-mentioned structure suggested in Japanese Laid-Open Patent Application Publication No. 2007-49796, although several values of the discharge overcurrent are set and corresponding various delay times can be set, the delay time at the time of detection is merely changed based on the value of the detection voltage. Therefore, the problems of the short circuit detection at the time of overcharging being the same as those in the related art may remain.

SUMMARY OF THE INVENTION

Accordingly, embodiments of the present invention may provide a novel and useful rechargeable battery protection integrated circuit device, a rechargeable battery protection module using the rechargeable battery protection integrated circuit device, and a battery pack solving one or more of the problems discussed above.

More specifically, the embodiments of the present invention may provide a rechargeable battery protection integrated circuit device whereby a short circuit state can be properly detected even during an overcharge time so that a rechargeable battery can be always and securely protected regardless of its being a normal time or the overcharge time, a rechargeable battery protection module using the rechargeable battery protection integrated circuit device, and a battery pack.

Another aspect of the present invention may be to provide a rechargeable battery protection integrated circuit device, including a short circuit detecting circuit configured to convert a discharge electric current of a rechargeable battery to a voltage value and detect a short circuit state of the rechargeable battery when the converted voltage value is equal to or greater than a designated short circuit detecting voltage; a discharge control terminal configured to output a control signal when the short circuit state is detected by the short circuit detecting circuit, the control signal being configured to stop a discharge of the rechargeable battery; and an overcharge detecting circuit configured to detect an overcharge of the rechargeable battery, wherein the short circuit detecting circuit includes a short circuit detecting voltage change part, the short circuit detecting voltage change part being configured to change the short circuit detecting voltage when the overcharge is detected by the overcharge detecting circuit.

Another aspect of the present invention may be to provide a rechargeable battery protection module, including the rechargeable battery protection integrated circuit device mentioned above; and a discharge control MOS transistor connected to a discharge control terminal of the rechargeable battery protection integrated circuit device.

Another aspect of the present invention may be to provide a battery pack, including the rechargeable battery protection module mentioned above; and a rechargeable battery where the rechargeable battery protection module is connected.

According to the embodiments of the present invention, it is possible to detect the short circuit state and protect the rechargeable battery from the short circuit state with high reliability even at the overcharge time.

Additional objects and advantages of the embodiments are set forth in part in the description which follows, and in part will become obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 10(a) shows a graph showing change of an input voltage of an inverter INV and FIG. 10(b) shows a graph showing an output voltage of the inverter INV corresponding to FIG. 10(a).

DETAILED DESCRIPTION OF THE PREFERRED EMBODIMENTS

A description is given below, with reference to the FIG. 4 through FIG. 10 of embodiments of the present invention.

Figure 1:
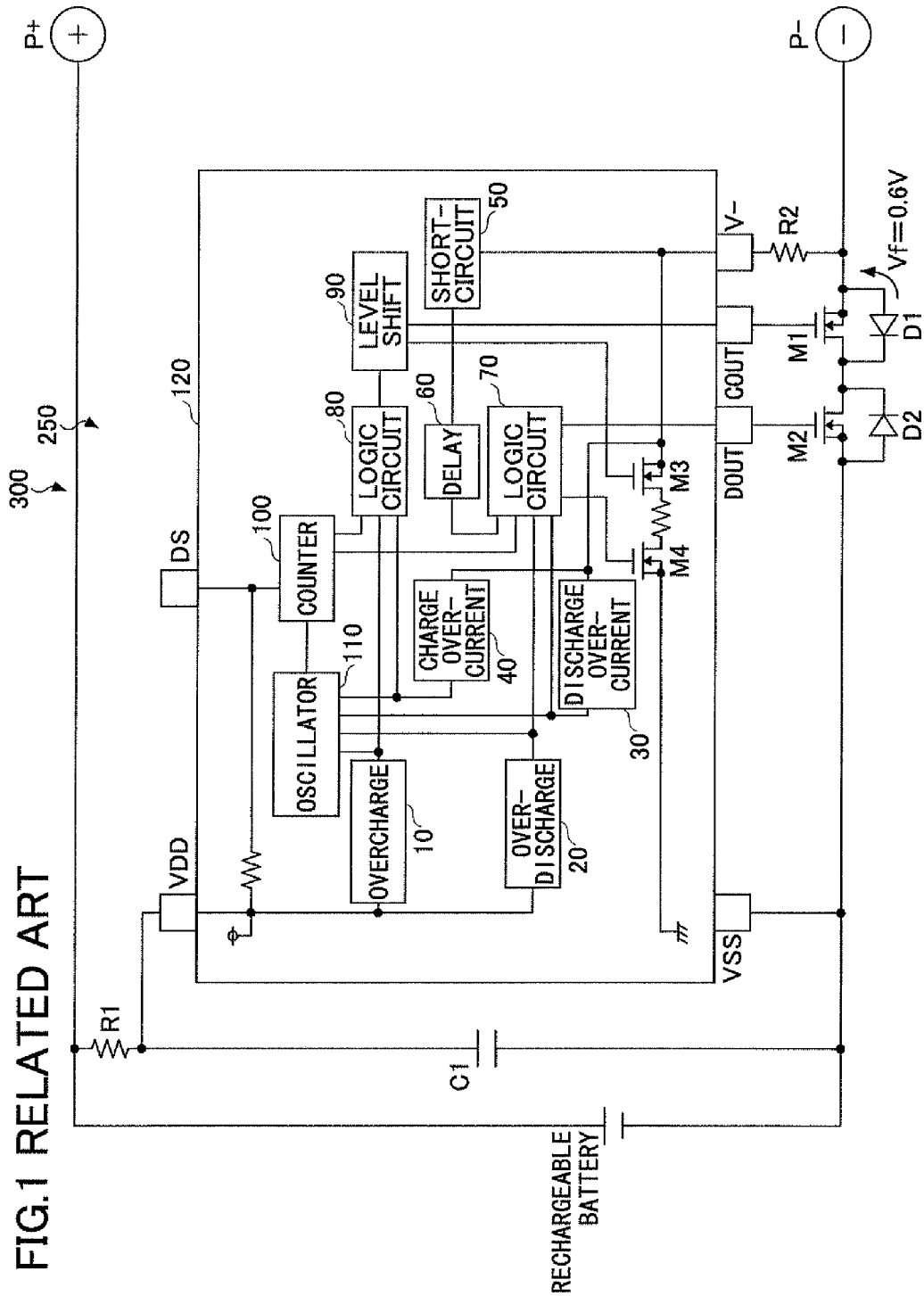
FIG. 1 is a circuit diagram of a related art rechargeable battery protection module.
Figure 2:
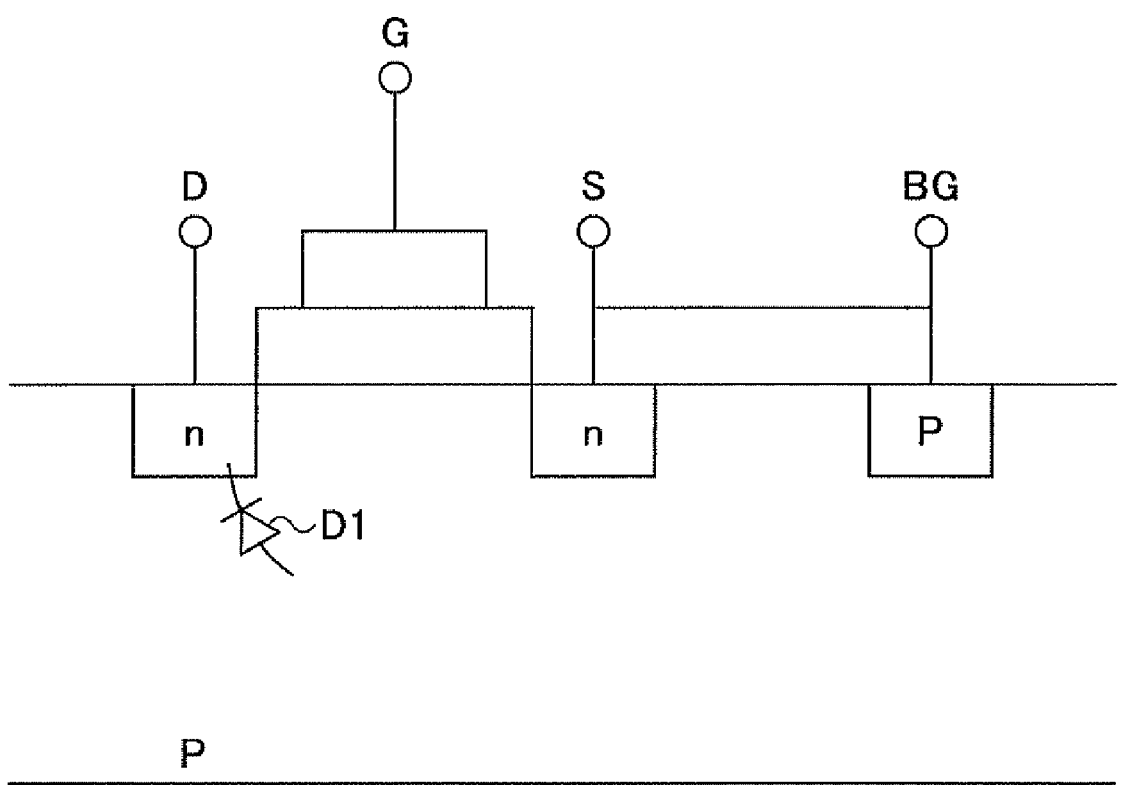
FIG. 2 is a view showing an example of a cross-sectional structure of a normal N channel MOS transistor.
Figure 3:
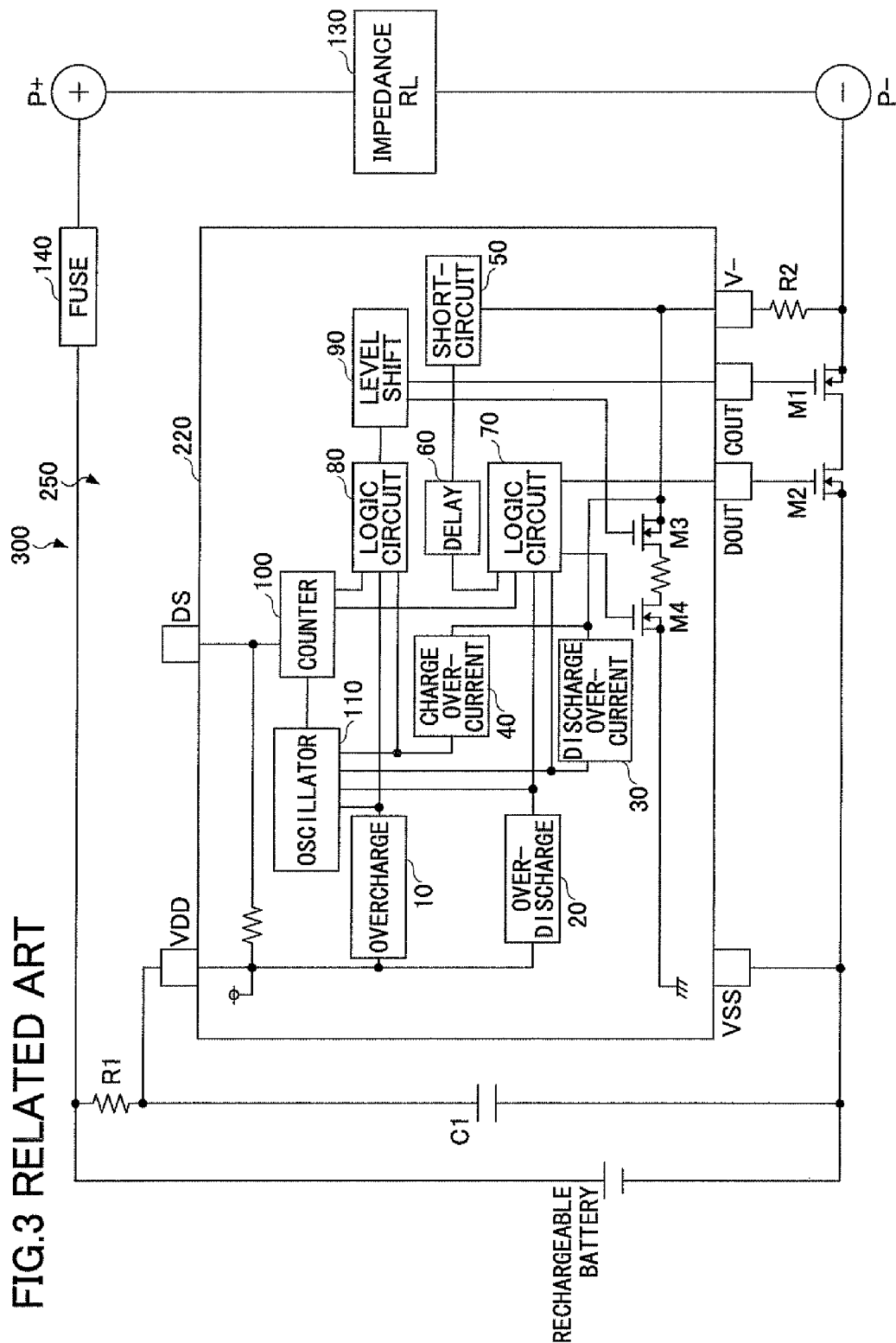
FIG. 3 is a circuit diagram showing a short circuit state of a related art battery pack 300.
Figure 4:
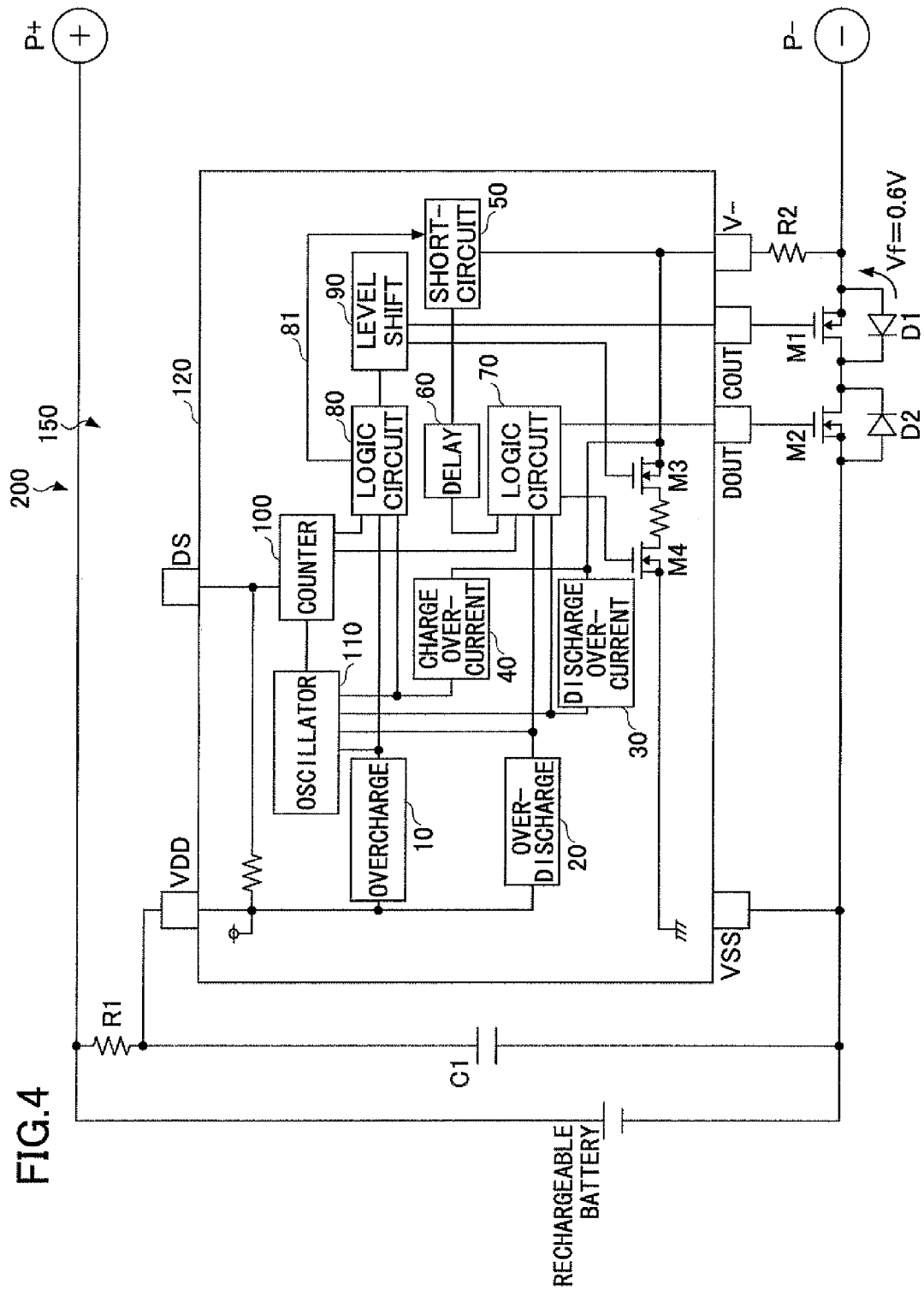
FIG. 4 is a circuit diagram of a rechargeable battery protection semiconductor integrated circuit device 120, a battery protection module 150, and a battery pack 200 of a first embodiment of the present invention.

FIG. 4 is a circuit diagram of a rechargeable battery protection semiconductor integrated circuit device 120, a battery protection module 150, and a battery pack 200 of a first embodiment of the present invention. In FIG. 4, parts that are the same as the parts shown in FIG. 1 through FIG. 3 are given the same reference numerals, and explanation thereof is omitted.

The battery pack 200 of the first embodiment of the present invention includes a rechargeable battery, a rechargeable battery protection module 150, and connection terminals P+ and P−. The rechargeable battery protection module 150 includes the rechargeable battery protection semiconductor integrated circuit device 120, attached outside (external) resistances R1 and R2, a capacitor C1, a charge control MOS transistor M1, and a discharge control MOS transistor M2.

Various rechargeable batteries such as a lithium ion rechargeable battery and a lithium polymer rechargeable battery may be applied to the rechargeable battery.

The rechargeable battery protection semiconductor integrated circuit device 120 is an IC (Integrated Circuit) configured to detect an abnormal state of the rechargeable battery such as overcharge, over-discharge, charge over-current, short-circuit, or the like and configured so as to protect the rechargeable battery. The rechargeable battery protection semiconductor integrated circuit device 120 may be configured to be an IC by receiving a semiconductor substrate having a protection circuit in a package and providing an outside terminal connected to the protection circuit. The rechargeable battery protection semiconductor integrated circuit device 120 protects a rechargeable battery by turning off attached outside (external) MOS transistors M1 and M2.

An attached outside (external) resistance R1 and an attached outside (external) capacitor C1 are elements configured to prevent change of an electric power source of the rechargeable battery protection semiconductor integrated circuit device 120. Attached outside (external) resistances R1 and R2 are electric current limiting resistances when the battery pack 200 is reverse-charged or when a charger whose voltage is equal to or greater than the absolute rating of the rechargeable battery protection semiconductor integrated circuit device 120 is connected.

The attached outside (external) charge control MOS transistor M1 is controlled based on a signal from the COUT terminal. The attached outside (external) charge control MOS transistor M1 is a switching element configured to be turned off at the time of overcharge so that charging the rechargeable battery is stopped. An N channel MOS transistor, for example, may be applied to the charge control MOS transistor M1. A drain of the charge control MOS transistor M1 is connected to an anode side of the rechargeable battery. A source of the charge control MOS transistor M1 is connected to a connection terminal P−. A gate of the charge control MOS transistor M1 is connected to the COUT terminal. A body diode D1 where a forward direction is from the source to the drain is formed with the charge control MOS transistor M1 in a parasitic manner. The COUT terminal is a charge control terminal configured to output a high level voltage signal or a low level voltage signal and control ON/OFF of the charge control MOS transistor M1.

The attached outside (external) discharge control MOS transistor M2 is controlled based on a signal from the DOUT terminal. The attached outside (external) discharge control MOS transistor M2 is a switching element configured to be turned off at the time of over-discharge or short circuit so that discharging from the rechargeable battery is stopped. An N channel MOS transistor, for example, may be applied to the discharge control MOS transistor M2. A drain of the discharge control MOS transistor M2 is connected to a charger connection terminal P−. A source of the discharge control MOS transistor M2 is connected to an anode side of the rechargeable battery. A gate of the discharge control MOS transistor M2 is connected to the DOUT terminal. A body diode D2 where a forward direction is from the source to the drain is formed with the discharge control MOS transistor M2 in a parasitic manner. The DOUT terminal is a discharge control terminal configured to output a high level voltage signal or a low level voltage signal as a discharge control signal and control ON/OFF of the discharge control MOS transistor M2.

Next, structural elements of the rechargeable battery protection semiconductor integrated circuit device 120 are discussed. The rechargeable battery protection semiconductor integrated circuit device 120 includes an overcharge detecting circuit 10, an over-discharge detecting circuit 20, a discharge over-current detecting circuit 30, a charge over-current detecting circuit 40, a short-circuit detecting circuit 50, a delay circuit 60, logic circuits 70 and 80, an overcharge detecting signal output part 81, a level shift circuit 90, a counter 100, an oscillator 110, a VDD terminal, a VSS terminal, a DS terminal, a DOUT terminal, a COUT terminal, and a V-terminal.

The overcharge detecting circuit 10 is configured to detect an overcharge state of the rechargeable battery if the voltage of the VDD terminal becomes higher than a designated charge detecting voltage at the time of charging the rechargeable battery. When the charge state is detected, the overcharge detecting circuit 10 outputs a low level from the COUT terminal via the logic circuit 80 and the level shift circuit 90 so that the charge control MOS transistor M1 is turned off.

The logic circuit 80 is configured to perform a logic circuit calculation on various inputs so as to output a calculation result signal to the level shift circuit 90. An input signal from the overcharge detecting circuit 10, the charge over-current detecting circuit 40, and the counter is input to the logic circuit 80. In addition, the battery protection module 150 of the first embodiment of the present invention includes the overcharge detecting signal output part 81. The overcharge detecting signal output part 81 is configured to output the overcharge detecting signal to the short circuit detecting circuit 50 in a case where the overcharge is detected by the overcharge detecting circuit 10 from the result of calculation by the circuit 80. In the battery protection module 150 of the first embodiment of the present invention, when the overcharge state is detected, setting of the short circuit detecting voltage of the short circuit detecting circuit 50 is changed. Therefore, when the overcharge state is detected, the overcharge detecting signal is output to the short circuit detecting circuit 50. The level shift circuit 90 is configured to convert the output of the logic circuit 80 to a voltage level necessary for driving control of the N channel MOS transistor M1 and an N channel MOS transistor M3.

When the voltage of the VDD terminal becomes equal to or lower than a designated discharge detecting voltage at the time of discharge of the rechargeable battery, the over-discharge state of the rechargeable battery is detected. When the over-discharge state is detected, the over-discharge detecting circuit 20 outputs a low level from the DOUT terminal via the logic circuit 70 so that the discharge control MOS transistor M2 is turned off. As a result of this, the discharging of the rechargeable battery is stopped.

When the voltage of the V-terminal becomes equal to or greater than a designated discharge over-current detecting voltage where the rechargeable battery is in a charge and discharge available state, the discharge over-current detecting circuit 30 detects the discharge over-current state. When the discharge over-current detecting circuit 30 detects the discharge over-current state, the low level voltage is output to the DOUT terminal via the logic circuit 70 so that the discharge control MOS transistor M2 is turned off. As a result of this, the discharging is stopped so that flow of a large amount of electric current to the circuit is prevented. The logic circuit 70 is configured to control an N channel MOS transistor M4. In addition, the V-terminal is an electric current detecting terminal configured to convert the electric current flowing in the circuit of the battery pack 200 to a voltage so as to detect it. Since the VSS terminal is at ground electric potential, it is possible to detect the electric current flowing in the circuit by detecting the voltage of the V-terminal. The V-terminal can detect both a charge electric current and a discharge electric current. When the charge electric current is detected, a negative voltage of the V-terminal is detected. When the discharge electric current is detected, a positive voltage of the V-terminal is detected.

When the voltage of the V-terminal becomes equal to or greater than the designated short circuit detecting voltage where the rechargeable battery is in the charge and discharge available state, the short circuit detecting circuit 50 detects the short-circuit state. The short circuit causes rapid discharging and therefore a positive voltage is detected as the short circuit detecting voltage. When the short circuit detecting circuit 50 detects the short-circuit state, the low level voltage is output to the DOUT terminal via the delay circuit 60 and the logic circuit 70 so that the discharge control MOS transistor M2 is turned off. As a result of this, the discharging is stopped so that flow of a large amount of electric current to the circuit is prevented. As discussed above, the DOUT terminal works as a discharge control terminal. The DOUT terminal is configured to output a control signal for stopping the discharge and a control signal for generating the discharge to the discharge control MOS transistor M2 so as to control the discharging of the rechargeable battery. In addition, in the short circuit detecting circuit 50 of the first embodiment of the present invention, the setting of the short circuit detecting voltage is changed related to the overcharge detecting time or a normal time other than the overcharge detecting time so that the short circuit state is properly detected considering the status of the rechargeable battery. Details of structures for this operation and details of operations are discussed below.

A detecting method and a control method of the discharge over-current detecting circuit 30 are substantially the same as those of the short circuit detecting circuit 50. However, the detected voltage, the delay time, or the like are different from each other between the discharge over-current detecting circuit 30 and the short circuit detecting circuit 50. In the rechargeable battery protection module 150 of the first embodiment of the present invention, the discharge over-current detecting circuit 30 and the short circuit detecting circuit 50 are different from each other in that the setting of the short circuit detecting voltage should be changed at the overcharge time or at a time other than the overcharge time while the discharge over-current detecting voltage is constant.

The charge over-current detecting circuit 40 detects the charge over-current state, if, in the charge and discharge available status, the voltage of the V-terminal becomes equal to or smaller than the charge over-current detecting voltage due to connection of the charger causing the abnormal voltage or electric current or the like. When the charge over-current detecting circuit 40 detects the charge over-current state, the low level is output from the COUT terminal via the logic circuit 80 and the level shift circuit 90 and the charge control MOS transistor M1 is turned off. As a result of this, flow of a large amount of electric current to the circuit is prevented.

The DS terminal is configured to shorten the delay time at the time of inspection of the battery pack 200. In addition, the oscillator 110 is configured to generate the oscillation of a designated frequency. The counter 100 is configured to convert the frequency of the clock signal. Furthermore, the delay circuit 60 is configured to generate the designated delay time.

Figure 5:
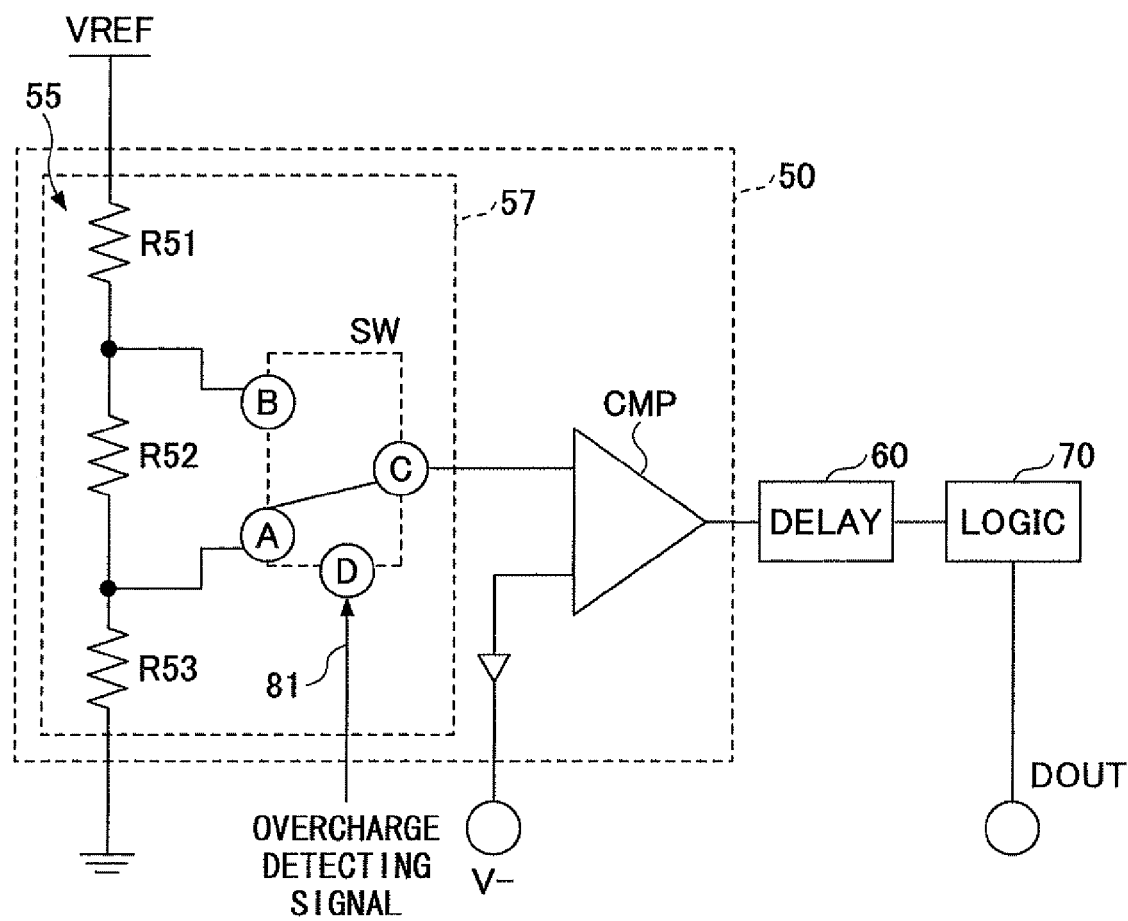
FIG. 5 is a view showing an internal structure of a short circuit detecting circuit 50 of the first embodiment of the present invention.

Next, an internal structure of the short circuit detecting circuit 50 which is a structural element of the rechargeable battery protection semiconductor integrated circuit device 120 of the first embodiment of the present invention is discussed with reference to FIG. 5. FIG. 5 is a view showing the internal structure of the short circuit detecting circuit 50 of the rechargeable battery protection semiconductor integrated circuit device 120 of the first embodiment of the present invention.

As shown in FIG. 5, the short circuit detecting circuit 50 of the first embodiment of the present invention includes a short circuit detecting voltage change part 57 and a comparator CMP. The short circuit detecting voltage change part 57 includes a voltage dividing circuit 55 and a switch SW. The voltage dividing circuit 55 is formed by series connection of resistances R51, R52, and R53. The voltage dividing circuit 55 is configured to generate the short circuit detecting voltage from a reference voltage Vref inside the rechargeable battery protection semiconductor integrated circuit device 120. A divided voltage of the resistance R53 of the voltage dividing circuit 55, namely (R53×Vref)/(R51+R52+R53), is output to a terminal A. A divided voltage of the resistances (R52+R53) of the voltage dividing circuit 55, namely (R52+R53)×Vref/(R51+R52+R53), is output to a terminal B. For example, 0.5 V is output to the terminal A by setting 0.5 V as the voltage drop across the resistance R53. In addition, 1.0 V is output to the terminal B by setting 1.0 V as the voltage drop across the resistances (R52+R53). By switching this connection by the switch SW, it is possible to generate, by the voltage dividing circuit 55, two of the short circuit detecting voltages, namely 1.0 V being greater than Vf and 0.5 V being smaller than Vf.

Here, one end of the switch SW is configured to switch the connection of the terminal A and the terminal B. Another end of the switch SW is connected to one of plural input terminals of the comparator CMP. Another end of the comparator CMP is connected to the V-terminal. Accordingly, the voltage detected by the V-terminal and the short circuit detecting voltage generated by the voltage dividing circuit 55 are compared with each other by the comparator CMP. The relay circuit 60 is connected to an output terminal of the comparator CMP. The logic circuit 70 is connected to the delay circuit 60. The output from the logic circuit 70 is output to the DOUT terminal so that the discharge control MOS transistor M2 is turned off. This is the same as the structure discussed with reference to FIG. 1. Various kinds of connection switching parts are applied to the switch SW. For example, a simple analog switch, a semiconductor switching element such as the MOS transistor, a relay part, or the like can be used as the switch SW.

Next, operations of the short circuit detecting voltage change part 57 are discussed. First, in a case where the overcharge is not detected by the overcharge detecting circuit 10, the overcharge detecting signal is not output from the overcharge detecting signal output part 81. In this case, the switch SW is connected to the terminal A. Since this is not the overcharge state, it is preferable to set the short circuit detecting voltage low so that the short circuit state can be securely detected even in a device where a small amount of electric current flows. When it is not the overcharge state, the charge control MOS transistor M1 is "on", and the on-resistance is several tens mΩ. Therefore, influence of the charge control MOS transistor M1 on an increase of electric potential of the V-terminal due to the on-resistance of the overcharge state is small and can be disregarded. Accordingly, the short circuit detecting voltage may be set being approximately 0.5 V which is lower than the normal Vf.

On the other hand, when the overcharge is detected by the overcharge detecting circuit 10, the overcharge detecting signal is output to the switch SW from the overcharge detecting signal output part 81. As a result of this, the switch SW switches the connection from the terminal A to the terminal B, and thereby the short circuit detecting voltage is set to a voltage higher than Vf, for example approximately 1.0 V. As long as the voltage detected from the V-terminal does not exceed the voltage having been set by the voltage dividing circuit of the resistances (R53+R52), a short circuit is not detected. In a case of the overcharge state, the voltage of the V-terminal is increased to 0.6 V by the forward direction voltage of the PN junction by the body diode D1 of the charge control MOS transistor M1 where the short circuit electric current or the over-discharge electric current does not flow. Therefore, when the short circuit detecting voltage is set to be 1.0 V, the voltage is actually set to be 1.0−0.6=0.4 V. Hence, the short circuit state can be properly detected.

Thus, according to the rechargeable battery protection integrated circuit device 120 of the first embodiment of the present invention, with the voltage dividing circuit 55, the switch SW, and a simple structure where the overcharge detecting signal is output to the short circuit detecting circuit 50, it is possible to securely and properly detect the short circuit state even in the overcharge detecting state or an over-discharge non-detecting state.

Figure 6:
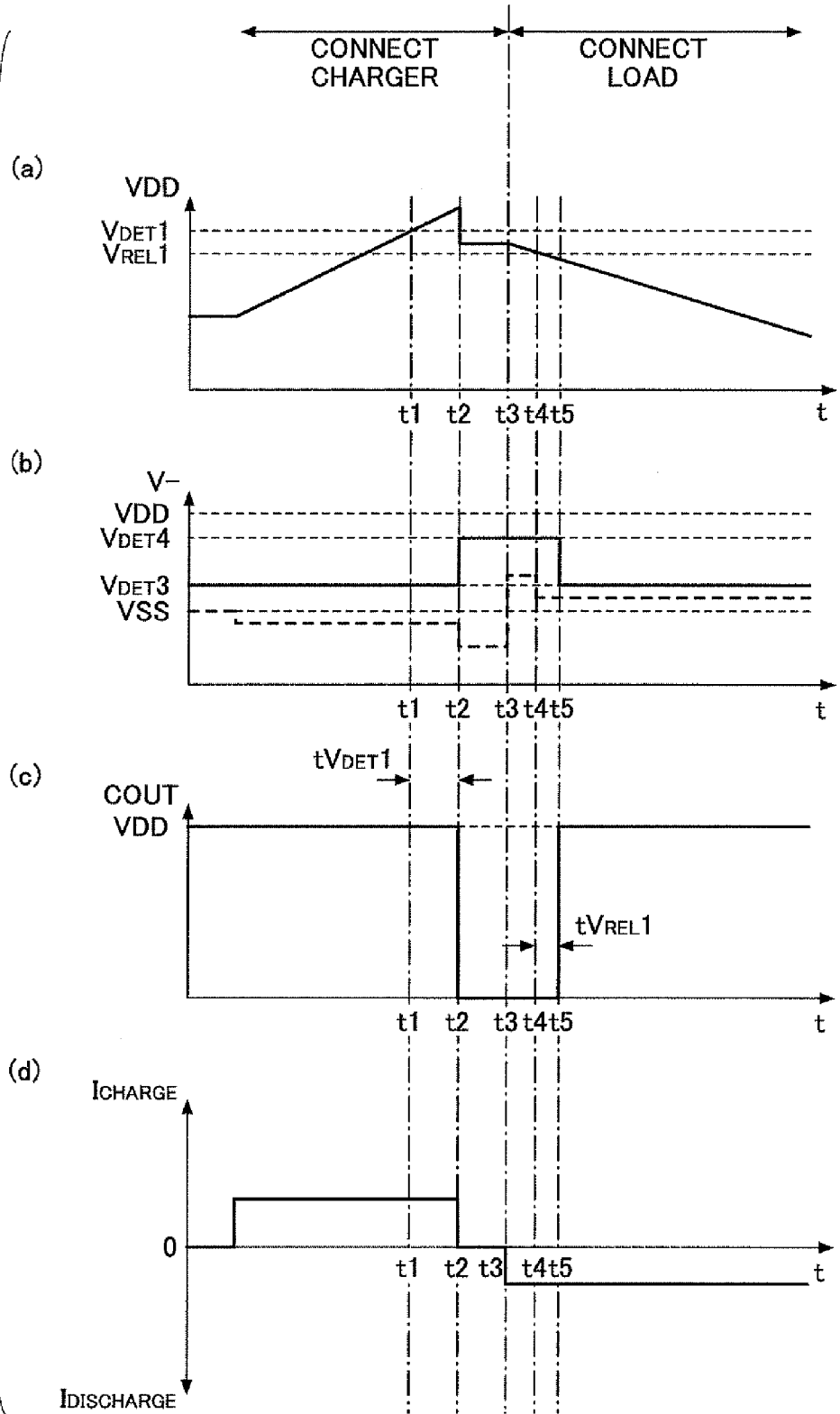
FIG. 6 is a timing chart of the rechargeable battery protection semiconductor integrated circuit device 120 of the first embodiment of the present invention.

FIG. 6 is a timing chart of the rechargeable battery protection module 150 including the rechargeable battery protection semiconductor integrated circuit device 120 of the first embodiment of the present invention. More specifically, FIG. 6(*a*) shows a voltage change of the VDD terminal; FIG. 6(*b*) shows a voltage change of the V-terminal; FIG. 6(*c*) shows a voltage change of the COUT terminal; and FIG. 6(*d*) shows change of the charge electric current and the discharge electric current. In FIG. 6(*b*), a solid line indicates a timing chart of the rechargeable battery protection semiconductor integrated circuit device 120 of the first embodiment of the present invention, and a dotted line indicates a timing chart of the related art rechargeable battery protection semiconductor integrated circuit device 220 as a comparative example.

Referring to FIG. 6(*a*), when the voltage of the VDD terminal is increased so as to reach the overcharge detecting voltage VDET1 at time t1 and delay time tVDET1 passes, the overcharge detecting circuit 10 detects overcharge at time t2. Referring to FIG. 6(*b*), while the short circuit detecting voltage at the V-terminal is VDET3 until the overcharge is detected, the short circuit detecting voltage is increased to VDET4 being higher than VDET3 after the overcharge is detected, namely at time t2. Because of this, the short circuit detecting voltage is increased at the overcharge detecting time to a value higher than the forward direction voltage Vf of the body diode D1 so that a proper short circuit detecting voltage is set. Referring to FIG. 6(*c*), as the voltage of the COUT terminal, VDD is output until time t2. A high level signal is output and the charge control MOS transistor M1 is turned on. Based on detection of the overcharge, a low level signal is output from the COUT terminal and the charge control MOS transistor M1 is turned off. Referring to FIG. 6(*d*), the overcharge electric current flows until time t2 but the electric current is zero at time t2.

Next, when the overcharge is maintained stopped, the terminal voltage of the rechargeable battery is maintained fixed. When a load is connected at time t3, the voltage is decreased. Referring to FIG. 6(*a*), the voltage of the terminal VDD is decreased to the charge recovering voltage VREL1 at time t4 after the load is connected at time t3. After the designated delay time tVREL1 passes, charging is restarted at time t5.

Referring to FIG. 6(b), the short detecting voltage is VDET4 until time t5. After the overcharge state is finished, the short circuit detecting voltage is returned to a normal short circuit detecting voltage VDET3. Because of this, in a normal condition other than the overcharge state, a short circuit detecting voltage can be set in the case of a device where a small amount of electric current flows. Referring to FIG. 6(c), at time t5, the COUT terminal outputs a high level signal and the charge control MOS transistor M1 is turned on so that charging restarts. Referring to FIG. 6(d), the electric current is switched to the discharge electric current at time t4 when the load is connected so that the discharge from the overcharge state is properly performed.

Thus, the short circuit detecting voltage is increased at the overcharge detecting time as shown in FIG. 6(b), so that the charge and discharge are properly performed as shown in FIG. 6(d).

(Second Embodiment)

Figure 7:
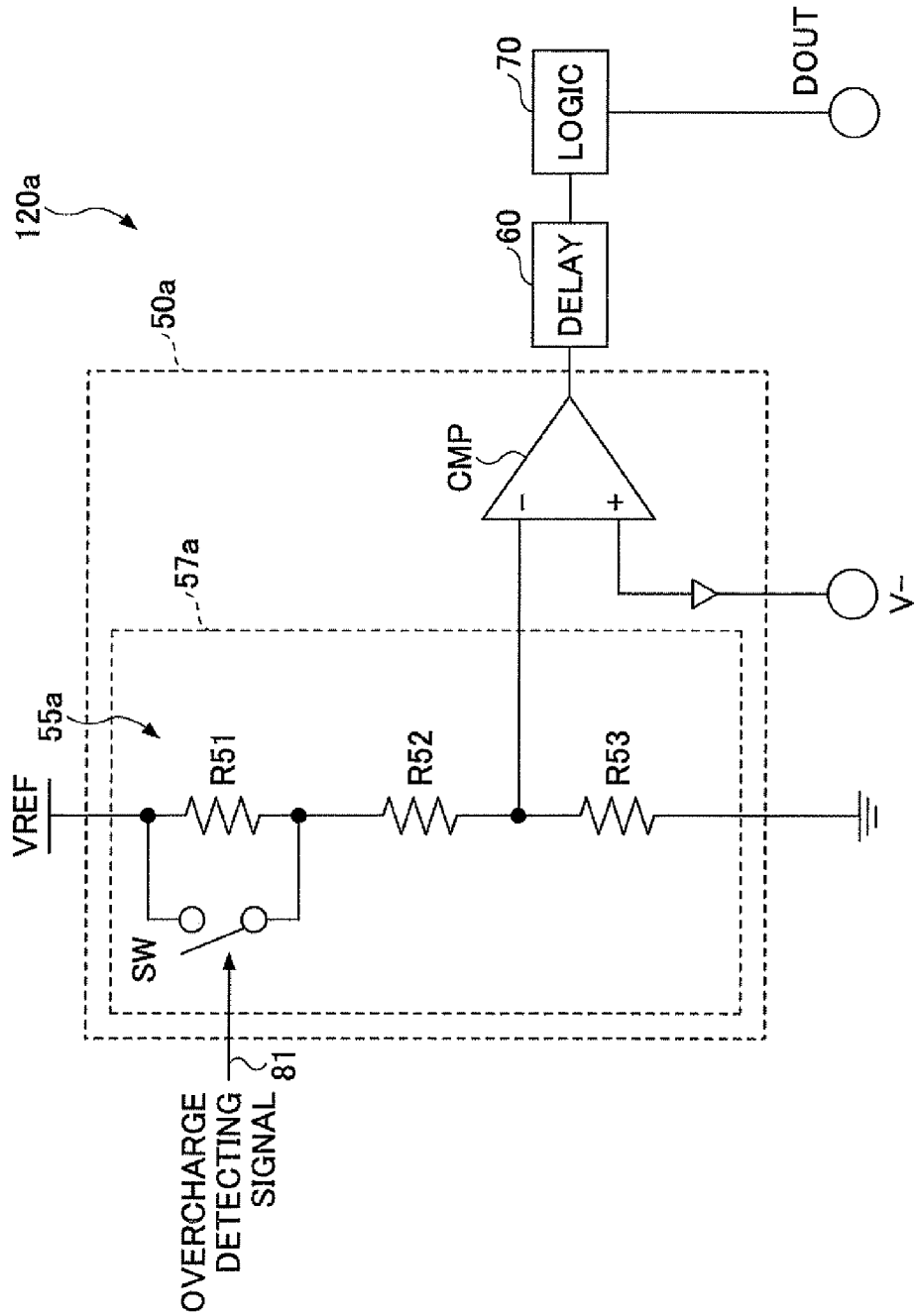
FIG. 7 is a circuit diagram showing an example of a structure of a short circuit detecting circuit 50a of a second embodiment of the present invention.

FIG. 7 is a circuit diagram showing an example of a structure of a short circuit detecting circuit 50a of a rechargeable battery protection integrated circuit device 120a of a second embodiment of the present invention. A whole structure of a rechargeable battery protection semiconductor integrated circuit device 120a, a battery protection module, and a battery pack of the second embodiment is substantially the same as that of the first embodiment shown in FIG. 1, and therefore explanation thereof is omitted. In the rechargeable battery protection integrated circuit device 120a of the second embodiment of the present invention, only a structure of a short circuit detecting voltage change part 57a of the short circuit detecting circuit 50a is different from the rechargeable battery protection integrated circuit device 120 and the rechargeable battery protection module 150 of the first embodiment of the present invention.

As shown in FIG. 7, the short circuit detecting circuit 50a of the rechargeable battery protection integrated circuit device 120a of the second embodiment of the present invention is substantially the same as the short circuit detecting circuit 50 of the first embodiment of the present invention in that the short circuit detecting circuit 50a includes a short circuit detecting voltage change part 57a, including a voltage dividing circuit 55a and a switch SW, and a comparator CMP. The short circuit detecting voltage change part 57a of the short circuit detecting circuit 50a of the second embodiment is different from the short circuit detecting voltage change part 57 of the short circuit detecting circuit 50 of the first embodiment in that the switch SW of the short circuit detecting voltage change part 57a is provided as a switch for switching whether the resistance R51 of the voltage dividing circuit 55a is short circuited or not.

In the voltage dividing circuit 55a, resistances 51, 52, and 53 are connected fixed to each other in series so that an electric potential of the resistance R53 is input to one of plural input terminals of the comparator CMP. On the other hand, the switch SW is connected to the resistance R51 in parallel. When the switch SW is turned on, the short circuit of the resistance R51a is made. When the switch SW is turned off, the resistance R51 is connected to a part of the dividing circuit 55a in series so that the voltage dividing circuit 55a is formed. Since the voltage Vref applied to the voltage dividing circuit 55a is constant, a setting of the short circuit detecting voltage being input to the comparator CMP can be changed by switching the switch SW on and off. In addition, information is transmitted from the overcharge detecting signal output part 81 to the switch SW so that the overcharge detecting signal is output. When the overcharge detecting signal is output from the overcharge detecting signal output part 81, the switch SW is turned on so that the resistance R51 is short circuited and the divided voltage being input to the comparator CMOP is increased. On the other hand, when the overcharge detecting signal is not output from the overcharge detecting signal output part 81, the switch SW is turned off so that the divided voltage being input to the comparator CMOP is decreased. In the second embodiment as well as the first embodiment, based on "on and off" switching of the switch SW, the resistances R51, R52, and R53 of the voltage dividing circuit 55a are controlled so that the short circuit detecting voltage being input to the comparator CMP becomes higher than the forward direction voltage Vf of the body diode D1 when the overcharge is detected. When the overcharge is not detected, the short circuit detecting voltage being input to the comparator CMP becomes lower than the forward direction voltage Vf of the body diode D1.

The short circuit detecting circuit 50a and the rechargeable battery protection integrated circuit device 120a of the second embodiment are the same as those of the first embodiment in that the V-terminal is connected to another input terminal of the comparator CMP; the relay circuit 60 and the logic circuit 70 are connected to an output terminal of the comparator CMP; and the DOUT terminal as the discharge control terminal is connected to the logic circuit 70.

According to the rechargeable battery protection integrated circuit device 120a of the second embodiment, as well as the rechargeable battery protection integrated circuit device 120 of the first embodiment, it is possible to securely change the short circuit detecting voltage by using the short circuit detecting voltage change part 57a having a simple structure formed by the voltage dividing circuit 55a and the switch SW.

(Third Embodiment)

Figure 8:
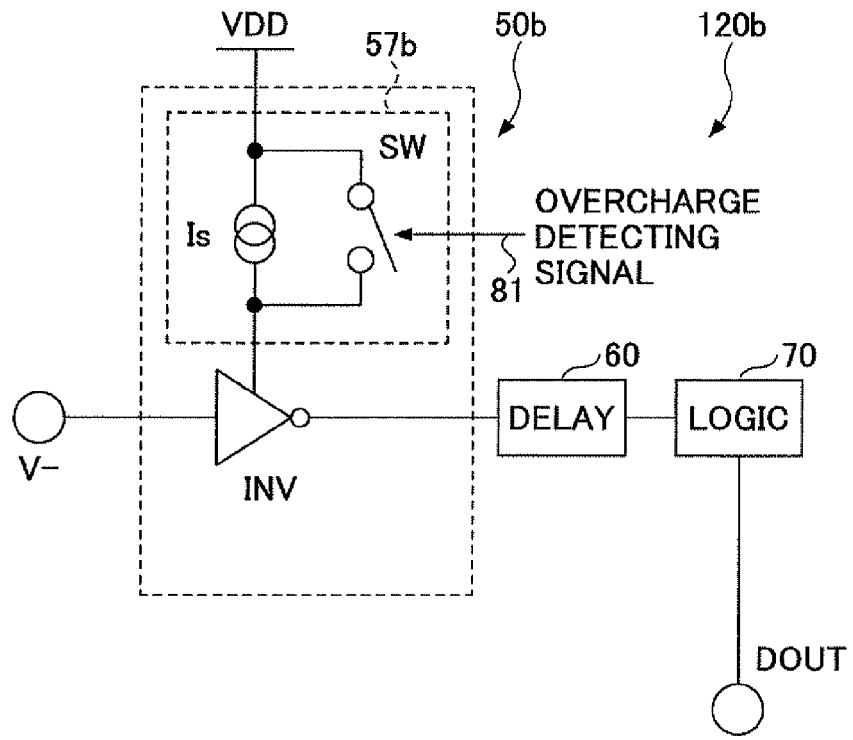
FIG. 8 is a circuit diagram showing an example of a structure of a short circuit detecting circuit 50b of a third embodiment of the present invention.

FIG. 8 is a circuit diagram showing an example of a structure of a short circuit detecting circuit 50b of a rechargeable battery protection integrated circuit device 120b of a third embodiment of the present invention. The rechargeable battery protection integrated circuit device 120b is different from the rechargeable battery protection integrated circuit devices 120 and 120a of the first and second embodiments in that an electric current source Is and an inverter INV, instead of the voltage dividing circuits 55 and 55a, are provided in the short circuit detecting circuit 50b. A whole structure of a rechargeable battery protection semiconductor integrated circuit device 120b, a battery protection module 150, and a battery pack 200 of the third embodiment is substantially the same as that of the first embodiment shown in FIG. 1, and therefore explanation thereof is omitted.

As shown in FIG. 8, the short circuit detecting circuit 50b of the third embodiment includes a short circuit detecting voltage change part 57b and the inverter INV. The short circuit detecting voltage change part 57b includes the electric current source Is and a switch SW. An overcharge detecting signal is output from the overcharge detecting signal output part 81 to the switch SW. In the short circuit detecting circuit 50b of the third embodiment, by changing a threshold value voltage of the inverter INV based on the overcharge detection or overcharge non-detection, an output voltage from the inverter INV is changed and setting of the short circuit detecting voltage is changed.

Figure 9:
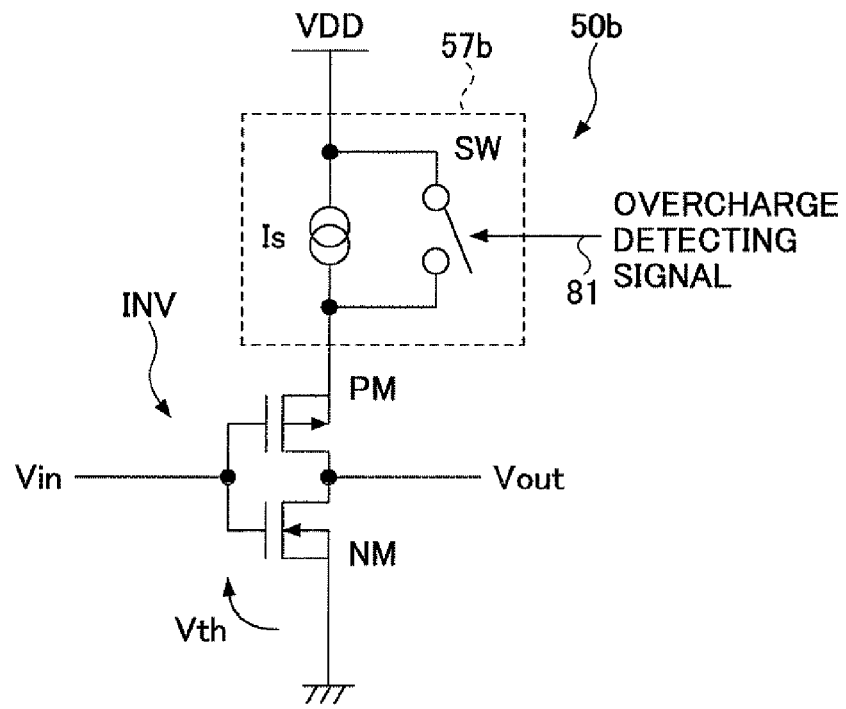
FIG. 9 is a detailed circuit diagram of the short circuit detecting circuit 50b of the third embodiment of the present invention.

FIG. 9 is a detailed circuit diagram of the short circuit detecting circuit 50b of the third embodiment of the present invention. As shown in FIG. 9, the inverter INV is formed as a CMOS (Complementary Metal Oxide Semiconductor) inverter. A drain of a high electric potential side P channel MOS transistor PM and a drain of a N channel MOS transistor NM are connected to each other. A source of the P channel MOS transistor PM is connected to the electric power source VDD. A source of the N channel MOS transistor NM is connected to ground. Gates of the P channel MOS transistor PM and the N channel MOS transistor NM form a common input of the inverter INV. Drains of the P channel MOS transistor PM and the N channel MOS transistor NM form a common output. In addition, an electric current source Is is provided between the source of the P channel MOS transistor PM and the electric power source VDD and the switch SW is connected in parallel with the electric current source Is so that the short circuit detecting voltage change part 57b is formed.

In the short circuit detecting circuit 50b, when the switch SW is turned on and the electric current source Is is short circuited, a threshold value voltage of the inverter INV is VDD/2. On the other hand, in a case where the switch SW is turned off and the electric current source Is is connected to the inverter INV, the threshold value voltage of the inverter INV is switched to a threshold electric potential Vth of the N channel MOS transistor NM.

Figure 10:
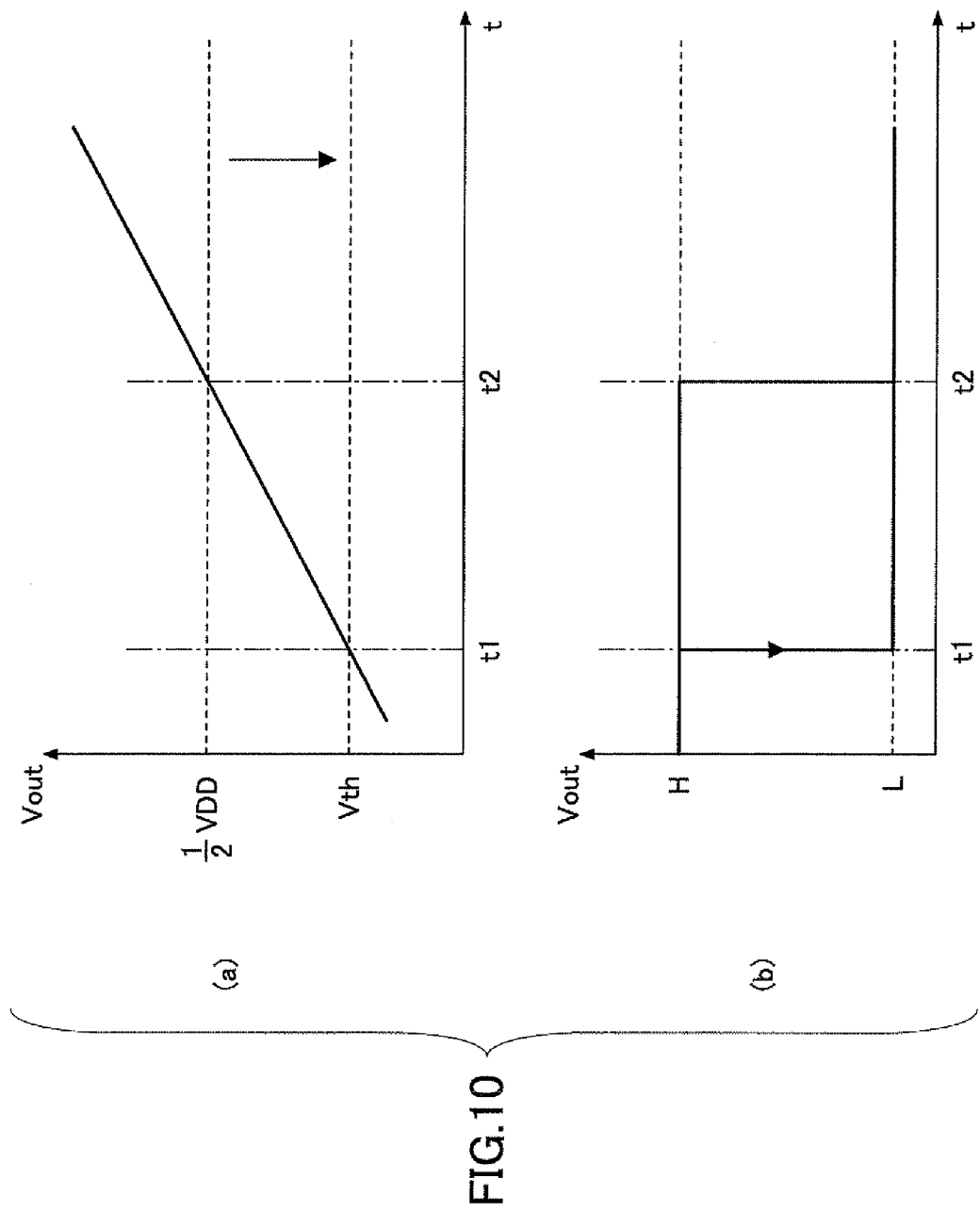
FIG. 10 shows graphs for explaining an example of operations of short circuit detecting circuit 50b of the third embodiment of the present invention, where

FIG. 10 shows graphs for explaining an example of operations of the short circuit detecting circuit 50b of the third embodiment of the present invention. More specifically, FIG. 10(a) shows a graph showing change of an input voltage of the inverter INV; and FIG. 10(b) shows a graph showing an output voltage of the inverter INV corresponding to FIG. 10(a).

A case where the switch SW of the short circuit detecting circuit 50b is turned on and the threshold value voltage of the inverter INV is set to be VDD/2 is discussed. Referring to FIG. 10(a), in a case where the input voltage to the inverter INV is gradually increased, the low level input voltage is applied at time t2 when the input voltage reaches the threshold value voltage VDD/2. Therefore, as shown in FIG. 10(b), high level H voltage is output. At the time t2 when the input voltage reaches the threshold value voltage VDD/2, the N channel MOS transistor NM is turned on so that the output voltage is switched to the high level. As shown in FIG. 10(b), the output voltage Vout is switched from the high level H to the low level L at time t2. If the VDD is, for example 4V, VDD/2 is 2 V and therefore a high threshold value voltage is set as the short circuit detecting voltage.

On the other hand, in a case where the switch SW is turned off and the electric current source Is is connected to the inverter INV, the threshold value of the inverter INV is a threshold electric potential Vth of the N channel MOS transistor NM. In this case, as shown in FIG. 10(a), if the input voltage of the inverter INV is gradually increased, the output voltage reaches the threshold electric potential Vth at time t1. As shown in FIG. 10(b), the output voltage is switched at time t1 from the high level H to the low level L. Since the threshold electric potential Vth of the N channel MOS transistor NM is approximately 0.6 V, it is possible to obtain a value close to the setting of a normal short circuit detecting voltage.

Referring back to FIG. 8, in a case where the overcharge detecting signal is output from the overcharge detecting signal output part 81, the switch SW is turned on and the threshold value voltage of the inverter INV is increased to VDD/2 so that the short circuit detecting voltage is set to be VDD/2. Because of this, the short circuit detecting voltage can be set to be equal to or greater than 1 V, for example, approximately 2 V, which is higher than the forward direction voltage Vf of the body diode D1. On the other hand, in a case where the overcharge detecting signal is not output from the overcharge detecting signal output part 81, the switch SW is turned off and the electric current source is connected. The threshold electric potential Vth of the N channel MOS transistor NM is set to the threshold value voltage of the inverter INV. Because of this, it is possible to set the short circuit detecting voltage to be approximately 0.6 V so that the short circuit state of the device working at a small amount of electric current can be detected.

The V-terminal is connected to an input of the inverter INV. The delay circuit 60 and the logic circuit 70 are connected to the output of the inverter INV. The result of calculation of the logic circuit 70 is output to the DOUT terminal so that the discharge control signal is output in this embodiment as well as the first and second embodiments.

Thus, according to the rechargeable battery protection integrated circuit device 120b of the third embodiment, the inverter INV works as an output element. The short circuit detecting voltage change part 57b configured to switch the output voltage of the inverter INV is formed by the electric current source Is and the switch SW. The threshold value voltage of the inverter INV can be switched by the short circuit detecting voltage change part so that the setting of the short circuit detecting voltage can be switched. The inverter INV and the electric current source Is, comparing the voltage dividing circuits 55 and 55a formed by the resistances, can be formed on a semiconductor substrate with a small space. Hence, it is possible to provide the short circuit detecting circuit, 50b on the semiconductor substrate without increasing the chip area. According to the third embodiment of the present invention, it is possible to provide the rechargeable battery protection integrated circuit device 120b configured to surely detect the short circuit with a small space.

According to the above-discussed embodiments of the present invention, it is possible to provide a rechargeable battery protection integrated circuit device (120, 120a, 120b), including:

a short circuit detecting circuit (50, 50a, 50b) configured to convert a discharge electric current of a rechargeable battery to a voltage value and detect a short circuit state of the rechargeable battery when the converted voltage value is equal to or greater than a designated short circuit detecting voltage;

a discharge control terminal (DOUT) configured to output a control signal when the short circuit state is detected by the short circuit detecting circuit (50, 50a, 50b), the control signal being configured to stop a discharge of the rechargeable battery; and an overcharge detecting circuit (10) configured to detect an overcharge of the rechargeable battery, wherein the short circuit detecting circuit (50, 50a, 50b) includes a short circuit detecting voltage change part (57, 57a, 57b), the short circuit detecting voltage change part being configured to change the short circuit detecting voltage when the overcharge is detected by the overcharge detecting circuit (10).

With the above-mentioned structure, it is possible to properly detect a short circuit state even in conditions different from a normal state by change the short circuit detecting voltage at the overcharge time so that the rechargeable battery can be protected.

The short circuit detecting voltage change part (57, 57a, 57b) may be configured to change the short circuit detecting voltage to a voltage value higher than a forward direction voltage (Vf) of a PN junction of the short circuit detecting voltage change part when the overcharge state is detected by the overcharge detecting circuit (10).

With the above-mentioned structure, it is possible to, by the body diode of the charge control MOS transistor, increase the short circuit detecting voltage even if the voltage detected by the short circuit detecting terminal is increased, so that only a true short circuit state can be detected as the short circuit state.

The short circuit detecting circuit (50, 50a, 50b) may include a comparator (CMP); and the short circuit detecting voltage change part (57, 57a, 57b) may include a voltage dividing circuit (55, 55a) configured to generate the short circuit detecting voltage supplied to one of input terminals of the comparator (CMP), and a switch (SW) configured to switch the short circuit detecting voltage supplied from the voltage dividing circuit (55, 55a) to the input terminal of the comparator (CMP) based on detection of the overcharge.

With the above-mentioned structure, it is possible to easily change the short circuit voltage by using a switch and a voltage dividing circuit and form the short circuit detecting voltage change part with a simple structure. Accordingly, it is possible to easily realize the change of the short circuit detecting voltage at low cost without increasing the chip area or the like. In addition, since the voltage dividing circuit is used, it is possible to securely change the short circuit voltage.

The short circuit detecting circuit (50, 50a, 50b) may include a CMOS inverter (INV); and the short circuit detecting voltage change part (57, 57a, 57b) may include an electric current source (Is) connected to a high electric potential side of a P channel MOS transistor (PM) forming the CMOS inverter (INV), and a switch (SW) configured to switch connection or non-connection of the electric current source (Is) based on detection of the overcharge.

With the above-mentioned structure, it is possible to easily provide the short detecting voltage change part with a simple structure and an area where the elements are arranged can be made small. Hence, it is possible to easily realize the short circuit detecting voltage change part.

According to the above-discussed embodiments of the present invention, it is possible to provide a rechargeable battery protection module (150), including the rechargeable battery protection integrated circuit device (120, 120a, 120b) mentioned above; and a discharge control MOS transistor (M2) connected to a discharge control terminal (DOUT) of the rechargeable battery protection integrated circuit device (120, 120a, 120b).

With the above-mentioned structure, it is possible to securely perform the short circuit detection at the overcharge time with high reliability. In addition, by connecting the attached outside (external) charge control MOS transistor, it is possible to securely perform the charge control. Hence, it is possible to provide the rechargeable battery protection module with high capabilities where the protection function of the rechargeable battery is high.

According to the above-discussed embodiments of the present invention, it is possible to provide a battery pack, including the rechargeable battery protection module (150) mentioned above; and a rechargeable battery where the rechargeable battery protection module (150) is connected.

With the above-mentioned structure, it is possible to provide a battery pack with high capabilities where the short circuit state can be properly detected even at the overcharge time.

It should be noted that numerical references in parentheses above are just examples for convenience of easy understanding. The present invention is not limited to this.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A rechargeable battery protection integrated circuit device, comprising:
   a short circuit detecting circuit configured to convert a discharge electric current of a rechargeable battery to a voltage value and detect a short circuit state of the rechargeable battery when the converted voltage value is equal to or greater than a designated short circuit detecting voltage;
   a discharge control terminal configured to output a control signal when the short circuit state is detected by the short circuit detecting circuit, the control signal being configured to stop a discharge of the rechargeable battery; and
   an overcharge detecting circuit configured to detect an overcharge of the rechargeable battery,
   wherein the short circuit detecting circuit includes a short circuit detecting voltage change part, the short circuit detecting voltage change part being configured to change the short circuit detecting voltage when the overcharge is detected by the overcharge detecting circuit.

2. The rechargeable battery protection integrated circuit device as claimed in claim 1,
   wherein the short circuit detecting voltage change part is configured to change the short circuit detecting voltage to a voltage value higher than a forward direction voltage of a PN junction of the short circuit detecting voltage change part when the overcharge state is detected by the overcharge detecting circuit.

3. The rechargeable battery protection integrated circuit device as claimed in claim 1,
   wherein the short circuit detecting circuit includes a comparator; and
   the short circuit detecting voltage change part includes
      a voltage dividing circuit configured to generate the short circuit detecting voltage supplied to one of input terminals of the comparator, and
      a switch configured to switch the short circuit detecting voltage supplied from the voltage dividing circuit to the input terminal of the comparator based on detection of the overcharge.

4. The rechargeable battery protection integrated circuit device as claimed in claim 1,
   wherein the short circuit detecting circuit includes a CMOS inverter; and
   the short circuit detecting voltage change part includes
      an electric current source connected to a high electric potential side of a P channel MOS transistor forming the CMOS inverter, and
      a switch configured to switch connection or non-connection of the electric current source based on detection of the overcharge.

5. A rechargeable battery protection module, comprising:
   the rechargeable battery protection integrated circuit device as claimed in claim 1; and
   a discharge control MOS transistor connected to a discharge control terminal of the rechargeable battery protection integrated circuit device.

6. A battery pack, comprising:
   the rechargeable battery protection module as claimed in claim 5; and
   a rechargeable battery where the rechargeable battery protection module is connected.

* * * * *